United States Patent
Bae et al.

(10) Patent No.: US 11,861,109 B1
(45) Date of Patent: Jan. 2, 2024

(54) DISPLAY DEVICE INCLUDING TOUCH PANEL AND METHOD OF DRIVING THE SAME

(71) Applicant: Samsung Display Co., Ltd., Yongin-si (KR)

(72) Inventors: Woomi Bae, Hwaseong-si (KR); Jinwoo Kim, Hwaseong-si (KR); Soongyu Lee, Seoul (KR); Hyojin Lee, Seongnam-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/100,228

(22) Filed: Jan. 23, 2023

(30) Foreign Application Priority Data

Jun. 23, 2022 (KR) .................. 10-2022-0077046

(51) Int. Cl.
| | | |
|---|---|---|
| G06F 3/041 | (2006.01) | |
| G06F 3/044 | (2006.01) | |
| G06F 3/042 | (2006.01) | |
| G06F 3/046 | (2006.01) | |
| G06F 3/043 | (2006.01) | |
| G06F 3/045 | (2006.01) | |

(52) U.S. Cl.
CPC ............ *G06F 3/0418* (2013.01); *G06F 3/044* (2013.01); *G06F 3/042* (2013.01); *G06F 3/043* (2013.01); *G06F 3/045* (2013.01); *G06F 3/046* (2013.01); *G06F 2203/04108* (2013.01)

(58) Field of Classification Search
CPC ........ G06F 3/0418; G06F 3/042; G06F 3/043; G06F 3/044; G06F 3/045; G06F 3/046; G06F 2203/04108
See application file for complete search history.

(56) References Cited

U.S. PATENT DOCUMENTS

| | | | | |
|---|---|---|---|---|
| 9,001,039 | B2 * | 4/2015 | Carmel-Veilleux | G06F 3/011 345/173 |
| 10,715,762 | B2 * | 7/2020 | Lee | G06F 3/04817 |
| 11,032,514 | B2 * | 6/2021 | Lee | H04N 7/147 |
| 2019/0037173 | A1 * | 1/2019 | Lee | G06F 3/04842 |
| 2020/0358981 | A1 * | 11/2020 | Lee | H04W 4/18 |

FOREIGN PATENT DOCUMENTS

| | | | | |
|---|---|---|---|---|
| KR | 101474061 B1 | 12/2014 | | |
| KR | 101501949 B1 | 3/2015 | | |
| WO | WO-2010014560 A1 * | 2/2010 | ............ | G06F 3/044 |
| WO | WO-2013079267 A1 * | 6/2013 | ............ | G06F 3/044 |

* cited by examiner

*Primary Examiner* — Michael Pervan
(74) *Attorney, Agent, or Firm* — CANTOR COLBURN LLP (57) ABSTRACT

A display device includes a display panel, a touch panel on the display panel, a host processor, and a display panel driver. The host processor receives proximity data of the touch panel. The display panel driver receives an input control signal from the host processor and drives the display panel based on the input control signal. The touch panel includes a proximity area and a non-proximity area. The host processor counts a rise of the proximity data in the proximity area to generate a first count value. The host processor resets the first count value when the proximity data in the non-proximity area increase.

20 Claims, 10 Drawing Sheets

DISPLAY DEVICE INCLUDING TOUCH PANEL AND METHOD OF DRIVING THE SAME

This application claims priority to Korean Patent Application No. 10-2022-0077046, filed on Jun. 23, 2022, and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a display device including a touch panel and a method of driving the display device including the touch panel.

2. Description of the Related Art

A touch panel is a device for recognizing an input action or input event by a user. In general, when the touch panel is touched by a conductor such as a finger or a stylus pen, the touch panel may generate an electrical signal to detect a touch and a location of the touch. The touch panel may be mounted on an upper surface of a display panel, such as an organic light emitting display panel or a liquid crystal display panel, or may be formed in the display panel. The touch panel may be classified into a resistive type, a capacitive type, an electromagnetic field type, an infrared type, a surface acoustic wave (SAW) type, and a near field imaging (NFI) type. Among these various types of touch panels, the capacitive type touch panel having a fast response speed and a thin thickness is widely used.

SUMMARY

In a display device including a touch panel, when a conductor (e.g., a user's face) approaches a specific area (a proximity area) of a display panel of the display device, a screen off mode for stopping image display of the display panel may operate. Conventionally, even when the conductor approaches and moves away from a non-proximity area rather than the specific area (proximity area) of the display panel, the screen off mode may be erroneously operated due to data interference.

Embodiments of the invention provide a display device including a touch panel driven without a malfunction of entering a screen off mode when proximity data in a non-proximity area increases.

Embodiments of the invention provide a method of driving the display device including a touch panel driven without a malfunction of entering a screen off mode when proximity data in a non-proximity area increases.

In an embodiment of a display device according to the invention, the display device includes a display panel, a touch panel on the display panel, a host processor, and a display panel driver. In such an embodiment, the host processor receives proximity data of the touch panel. In such an embodiment, the display panel driver receives an input control signal from the host processor and drives the display panel. In such an embodiment, the touch panel includes a proximity area and a non-proximity area. In such an embodiment, the host processor counts a rise of the proximity data in the proximity area to generate a first count value. In such an embodiment, the host processor resets the first count value when the proximity data in the non-proximity area increases.

In an embodiment, the host processor may stop displaying an image on the display panel when the first count value is equal to or greater than a first reference value.

In an embodiment, the host processor may count the rise of the proximity data in the non-proximity area to generate a second count value and reset the first count value when the second count value is greater than or equal to a second reference value.

In an embodiment, the host processor may determine the rise of the proximity data in the non-proximity area based on a slope of the proximity data.

In an embodiment, the host processor may extract two proximity data at a predetermined time interval and increase the second count value when the slope of the two proximity data is positive.

In an embodiment, the host processor may determine the rise of the proximity data in the proximity area based on the slope of the proximity data.

In an embodiment, the host processor may extract two proximity data at a predetermined time interval, and increase the first count value when the slope of the two proximity data is positive.

In an embodiment, the non-proximity area of the touch panel may be disposed lower than the proximity area of the touch panel.

In an embodiment, the first count value may be reset immediately after the proximity data in the non-proximity area increases.

In an embodiment, the first count value may be reset after a predetermined delay time from a time point when the proximity data in the non-proximity area increases.

In an embodiment, the first count value may be reset by a rising period of the proximity data in the non-proximity area from a time point when the rise of the proximity data in the non-proximity area is finished.

In an embodiment, the proximity data may be a capacitance.

In an embodiment of a method of driving a display device according to the invention, the method includes measuring proximity data of a touch panel, of the display device providing the proximity data of the touch panel to a host processor, of the display device generating a first count value by counting a rise of the proximity data in a proximity area of the touch panel and resetting the first count value when the proximity data in a non-proximity area of the touch panel increases.

In an embodiment, the method of driving the display device may further include stopping displaying an image of a display panel of the display device when the first count value is equal to or greater than a first reference value.

In an embodiment, the host processor may count a rise of the proximity data in the non-proximity area to generate a second count value, and reset the first count value when the second count value is greater than or equal to a second reference value.

In an embodiment, the host processor may determine the rise of the proximity data in the non-proximity area based on a slope of the proximity data.

In an embodiment, the host processor may extract two proximity data at a predetermined time interval, and increase the second count value when the slope of the two proximity data is positive.

In an embodiment, the first count value may be reset immediately after the proximity data in the non-proximity area increases.

In an embodiment, the first count value may be reset after a predetermined delay time from a time point when the proximity data in the non-proximity area increases.

In an embodiment, the first count value may be reset by a rising period of the proximity data in the non-proximity area from a time point when the rise of the proximity data in the non-proximity area is finished.

According to embodiments of the display device and the method of driving the display device, the first count indicating the rise of the proximity data in the proximity area may be reset, when the proximity data in the non-proximity area increases. Accordingly, when the conductor approaches and moves away from the non-proximity area, the malfunction of entering the screen off mode may be effectively prevented. Thus, the accuracy of the screen off mode function may be enhanced and the reliability of the display device may be enhanced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1:
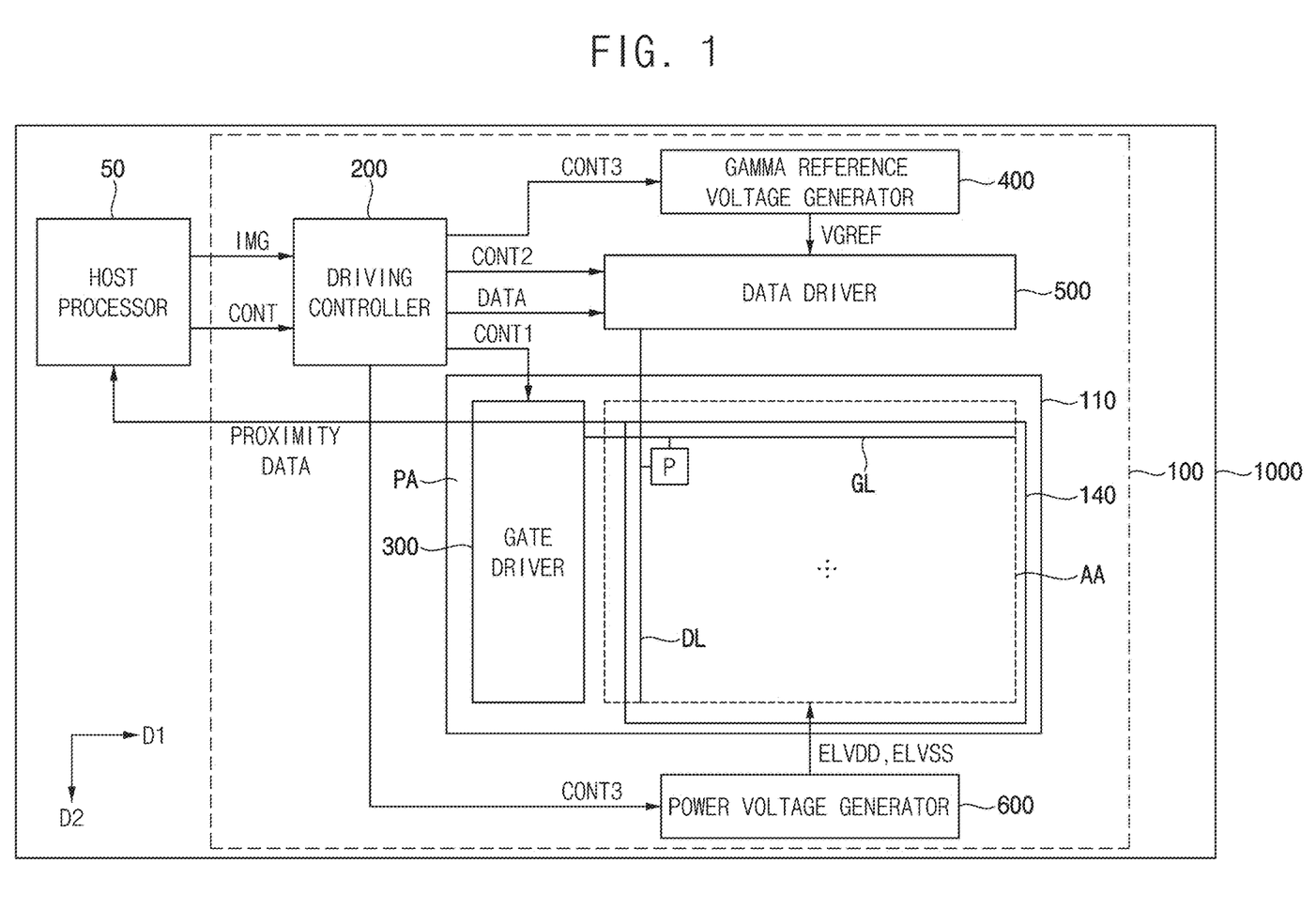
FIG. 1 is a block diagram illustrating a display device according to an embodiment of the invention.

FIG. 1 is a block diagram illustrating a display device 100 according to an embodiment of the invention.

Referring to FIG. 1, an embodiment of an electronic device 1000 includes a host processor 50 and a display device 100. The display device 100 may include a touch panel 140, a display panel 110, and a display panel driver. The display panel driver includes a driving controller 200, a gate driver 300, a gamma reference voltage generator 400 and a data driver 500. The display panel driver may further include a power voltage generator 600.

In an embodiment, for example, the driving controller 200 and the data driver 500 may be integrally formed as a single chip. In an alternative embodiment, for example, the driving controller 200, the gamma reference voltage generator 400, and the data driver 500 may be integrally formed as a single chip. In another alternative embodiment, for example, the driving controller 200, the gamma reference voltage generator 400, the data driver 500, and the power voltage generator 600 may be integrally formed as a single chip or module. A driving module including at least the driving controller 200 and the data driver 500 which are integrally formed may be referred to as a timing controller embedded data driver (TED).

The touch panel 140 may be mounted on an upper surface of the display panel 110 or formed in the display panel 110. In an embodiment, for example, the touch panel 140 may be one of a resistive type, a capacitive type, an electromagnetic field method, an infrared method, a surface acoustic wave (SAW) type, and a near field imaging (NFI) type.

The host processor 50 may receive proximity data of the touch panel 140. The host processor 50 may determine whether a conductor approaches the touch panel 140 based on the proximity data provided from the touch panel 140. In an embodiment, for example, the host processor 50 may determine whether the conductor approaches the touch panel 140 by determining a distance between the touch panel 140 and the conductor based on the proximity data. The host processor 50 may generate input image data IMG and an input control signal CONT, and provide the generated input image data IMG and the input control signal CONT to the driving controller 200.

The display panel 110 includes a display region AA on which an image is displayed and a peripheral region PA adjacent to the display region AA.

In an embodiment, for example, the display panel 110 may be an organic light emitting diode display panel including an organic light emitting diode. In an alternative embodiment, for example, the display panel 110 may be a quantum-dot organic light emitting diode display panel including an organic light emitting diode and a quantum-dot color filter. In another alternative embodiment, for example, the display panel 110 may be a quantum-dot nano light emitting diode display panel including a nano light emitting diode and a quantum-dot color filter. In another alternative embodiment, for example, the display panel 110 may be a liquid crystal display panel including a liquid crystal layer.

The display panel 110 includes a plurality of gate lines GL, a plurality of data lines DL, and a plurality of pixels P electrically connected to the gate lines GL and the data lines DL. The gate lines GL extend in a first direction D1, and the data lines DL extend in a second direction D2 crossing the first direction D1. The display panel 110 may be driven by the display panel driver to display an image.

The driving controller 200 receives the input image data IMG and the input control signal CONT from the host processor 50 (or an application processor). In an embodiment, for example, the input image data IMG may include red image data, green image data, and blue image data. The input image data IMG may further include white image data. Alternatively, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates a fourth control signal CONT4 for controlling the operation of the power voltage generator 600 based on the input image data IMG and the input control signal CONT to generate the power voltage generator 600, and outputs the fourth control signal CONT4 to the power voltage generator 600. In an embodiment, for example, the fourth control signal CONT4 may be a power voltage level signal that determines a level of a power voltage. In an embodiment, for example, the driving controller 200 may generate the fourth control signal CONT4 for controlling the operation of the power voltage generator 600 using the input control signal CONT provided from the host processor 50 and output the fourth control signal CONT4 to the power voltage generator 600.

The gate driver 300 generates gate signals driving the gate lines GL in response to the first control signal CONT1 received from the driving controller 200. The gate driver 300 outputs gate signals to the gate lines GL. In an embodiment, for example, the gate driver 300 may sequentially output the gate signals to the gate lines GL.

In an embodiment, the gate driver 300 may be integrated on the peripheral region PA of the display panel 110.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to the data signal DATA.

In an embodiment, the gamma reference voltage generator 400 may be disposed in the driving controller 200 or in the data driver 500.

The data driver 500 receives the second control signal CONT2 and the data signal DATA from the driving controller 200, and receives the gamma reference voltage VGREF from the gamma reference voltage generator 400. The data driver 500 converts the data signal DATA into an analog data voltage VDATA using the gamma reference voltage VGREF. The data driver 500 outputs the data voltage VDATA to the data line DL.

The power voltage generator 600 may generate a first power voltage ELVDD and output the first power voltage ELVDD to the display panel 110. The power voltage generator 600 may generate a second power voltage ELVSS and output the second power voltage ELVSS to the display panel 110. In addition, the power voltage generator 600 may generate a gate driving voltage for driving the gate driver 300 and output the gate driving voltage to the gate driver 300. In addition, the power voltage generator 600 may generate a data driving voltage for driving the data driver 500, and output the data driving voltage to the data driver 500. The first power voltage ELVDD may be a high power applied to the pixel P of the display panel 110, and the second power voltage ELVSS may be a low power applied to the pixel P of the display panel 110.

The display device 100 according to embodiments of the invention may support a screen off mode, in which an image is not displayed on the display panel 110, as well as a normal mode in which the image is displayed on the display panel 110. In an embodiment, for example, when the display device 100 is powered on, the display device 100 may be first driven in the normal mode. In such an embodiment, when a predetermined condition is satisfied, the driving mode of the display device 100 may become the screen off mode changed from the normal mode.

Figure 2:
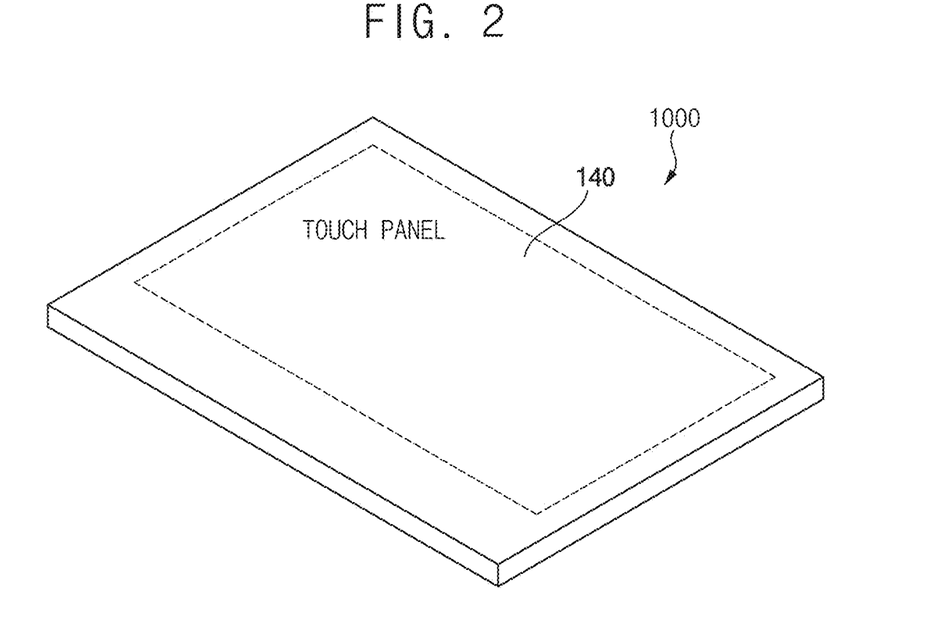
FIG. 2 is a schematic diagram illustrating an embodiment of the display device of FIG. 1.
Figure 3:
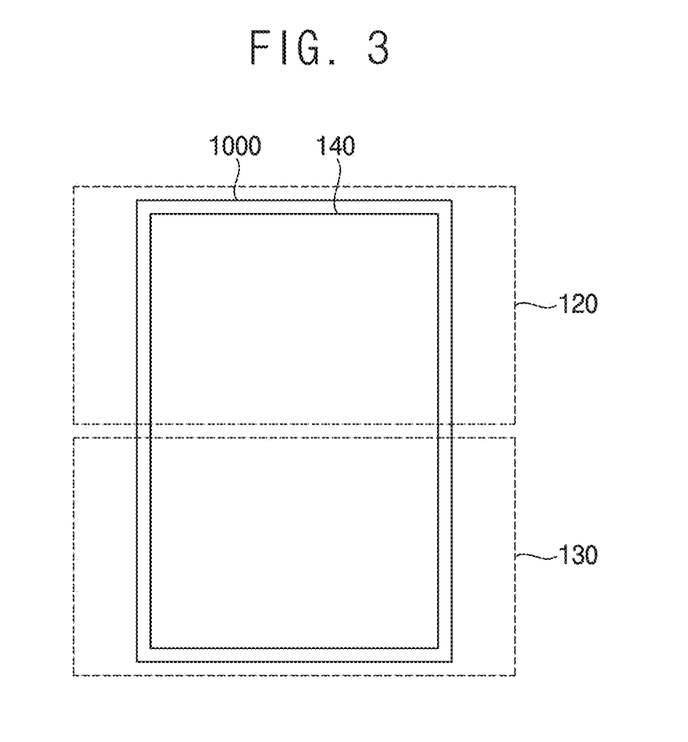
FIG. 3 is a block diagram illustrating an embodiment of a touch panel of FIG. 1 including a proximity area and a non-proximity area.

FIG. 2 is a schematic diagram illustrating an embodiment of the display device 100 of FIG. 1. FIG. 3 is a block diagram illustrating an embodiment of a touch panel 140 of FIG. 1 including a proximity area 120 and a non-proximity area 130.

Referring to FIG. 2 and FIG. 3, the touch panel 140 may be mounted on the upper surface of the display panel 110. The host processor 50 may receive the proximity data of the touch panel 140. In an embodiment, for example, when the conductor approaches the touch panel 140, the host processor 50 may determine whether the conductor approaches the touch panel 140 by a change amount of a capacitance of an internal electrode of the display device 100. In an embodiment, for example, when the conductor approaches the touch panel 140, the proximity data of the touch panel 140 may increase. When the distance between the conductor and the touch panel 140 increases, the proximity data of the touch panel 140 may decrease.

In an embodiment, the touch panel 140 may include the proximity area 120 and the non-proximity area 130. In an embodiment, for example, the non-proximity area 130 of the touch panel 140 may be disposed lower than the proximity area 120.

Figure 4:
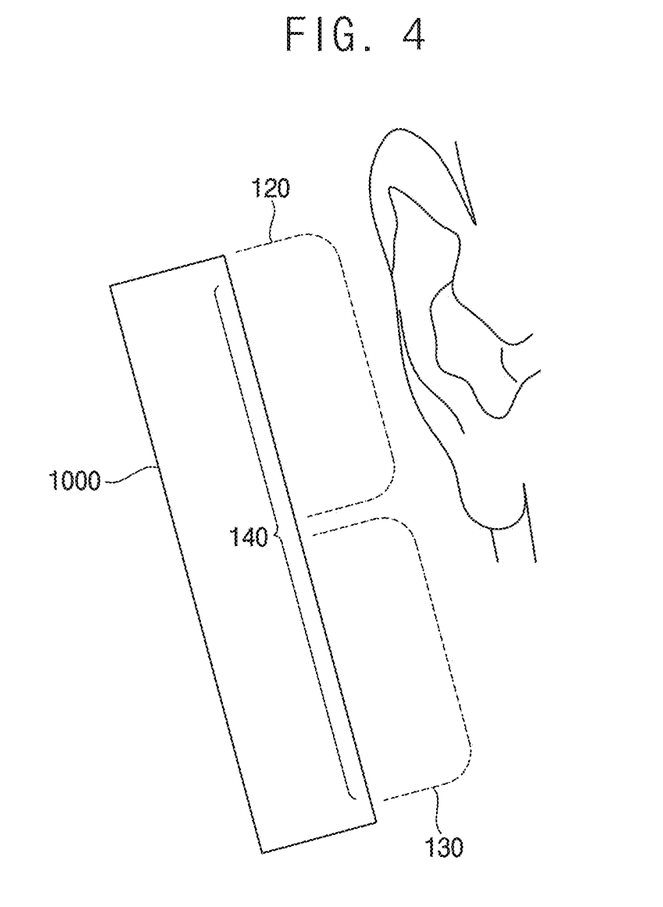
FIG. 4 is a diagram illustrating a case in which a conductor approaches the touch panel in the proximity area of FIG. 3.

FIG. 4 is a diagram illustrating a case in which the conductor approaches the touch panel 140 in the proximity area 120 of FIG. 3

Referring to FIG. 4, the host processor 50 may receive the proximity data of the touch panel 140. In an embodiment, for example, the host processor 50 may receive the change amount of the capacitance of the touch panel 140. When the conductor approaches the touch panel 140 in the proximity area 120, the host processor 50 may determine whether the conductor approaches the touch panel 140 based on a change amount of the proximity data in the proximity area 120. In an embodiment, for example, the host processor 50 may determine the distance between the conductor and the touch panel 140 based on the change amount of the proximity data, so that whether the conductor approaches the touch panel 140 may be determined based on the change amount of the proximity data. In an embodiment, for example, when the conductor approaches the touch panel 140, the proximity data of the touch panel 140 may increase. When the distance between the conductor and the touch panel 140 increases, the proximity data of the touch panel 140 may decrease.

In such an embodiment, by determining whether the conductor approaches the touch panel 140, the display device 100 may enter the screen off mode in which the display panel 110 does not display the image to reduce the power consumption. In an embodiment, for example, when the conductor approaches the touch panel 140, the proximity data of the touch panel 140 may increase. In an embodiment, for example, when the conductor approaches the touch panel 140, whether the conductor approaches the touch panel 140 may be determined based on the change amount of the capacitance of the internal electrode of the display device 100. As such, the screen off mode may be entered by determining whether the conductor approaches the proximity area 120 based on the proximity data of the touch panel 140. In addition, the host processor 50 may receive the proximity data of the touch panel 140. The host processor 50 may operate the screen off mode based on the proximity data provided from the touch panel 140. In an embodiment, for example, the host processor 50 may determine whether to turn on/off the power of the display panel 110 based on the proximity data provided from the touch panel 140.

In an embodiment, for example, the screen off mode may be a screen off mode during a call. When a user's face approaches the proximity area 120 of the touch panel 140 during the call, the display panel 110 may stop displaying the image to reduce the power consumption. However, when the user's face approaches the non-proximity area 130 of the touch panel 140 during the call, the display of the image on the display panel 110 may not be stopped.

In an embodiment, for example, the proximity area 120 may be an upper portion of the touch panel 140, and an area for determining whether to stop displaying the image of the display panel 110 when a conductor approaches the proximity area 120. The non-proximity area 130 may be a lower portion of the touch panel 140, and the display of the image on the display panel 110 may not be stopped regardless of whether the conductor approaches or moves away from the non-proximity area 130. The proximity area 120 may be an area for determining the screen off mode, and the non-proximity area 130 may be an area independent from a determination of the screen off mode.

When the determination process of whether to enter the screen off mode is performed once, the accuracy of the determination of whether the conductor approaches the touch panel 140 may be low. Accordingly, even when the conductor does not approach the touch panel 140, the display panel 110 may erroneously enter the screen off mode, in which the image is not displayed, due to a signal interference or a noise. Therefore, an accuracy of an operation of the screen off mode may be low.

In an embodiment of the invention, the host processor 50 may count the rise of the proximity data of the touch panel 140 in the proximity area 120 to determine whether to enter the screen off mode. In such an embodiment, since whether to enter the screen off mode may be determined not based on one rise of the proximity data of touch panel 140 but several rises of the proximity data, the accuracy of the operation of the screen off mode may be improved.

Figure 5:
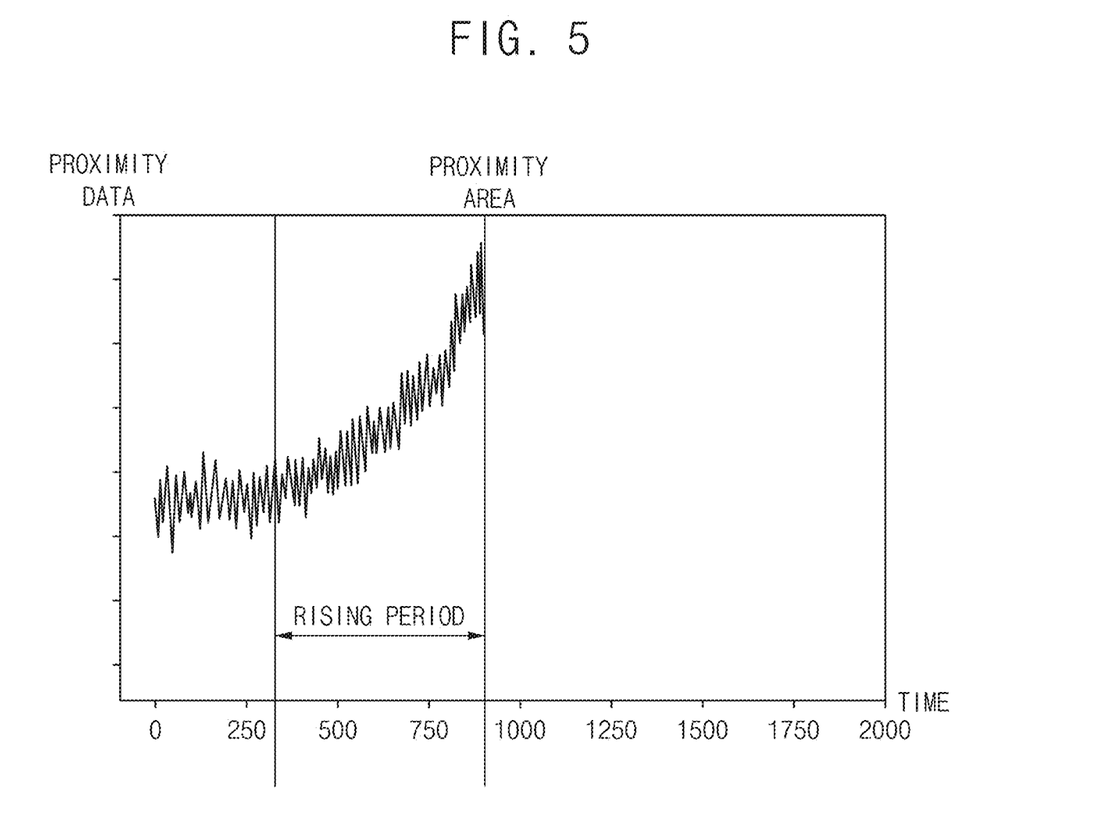
FIG. 5 is a graph illustrating proximity data in the proximity area when the conductor approaches the touch panel in the proximity area of FIG. 3.

FIG. 5 is a graph illustrating the proximity data in the proximity area 120 when the conductor approaches the touch panel 140 in the proximity area 120 of FIG. 3.

Referring to FIG. 5, the host processor 50 may enhance the accuracy of the operation of the screen off mode by counting the rise of the proximity data of the touch panel 140 in the proximity area 120 to determine whether to enter the screen off mode. In an embodiment, for example, the host processor may receive the proximity data in the proximity area 120. The host processor 50 may determine whether the conductor approaches the touch panel 140 in the proximity area 120 based on the proximity data provided from the touch panel 140. In addition, the host processor 50 may generate a first count value by counting the rise of the proximity data in the proximity area 120. The host processor 50 may determine whether the first count value is equal to or greater than a first reference value, and when the first count value is equal to or greater than the first reference value, the display device 100 may enter the screen off mode. Accordingly, the host processor 50 may generate the first count value by counting the rise of the proximity data in the proximity area 120, and when the first count value is equal to or greater than the first reference value, the display panel 110 may be powered off.

In an embodiment, the host processor 50 may determine the rise of the proximity data in the proximity area 120 based on a slope of the proximity data. In an embodiment, for example, the host processor 50 may determine the distance between the touch panel 140 and the conductor based on the proximity data provided from the touch panel 140. In such an embodiment, the rise of the proximity data in the proximity area 120 may be determined based on the slope of the proximity data to determine the distance between the touch panel 140 and the conductor.

In an embodiment, the host processor 50 may extract two proximity data in the proximity area 120 at a predetermined time interval, that is, two proximity data with a predetermined time interval therebetween. When the slope of the two proximity data in the proximity area 120 is positive, the first count value may be increased. In an embodiment, for example, the host processor 50 may extract the proximity data in the proximity area 120 at the predetermined time interval, and may generate the first count value by counting the rise of the proximity data in the proximity area 120. When the slope of the two proximity data in the proximity area 120 is positive, the first count value may be increased, and when the slope of the two proximity data in the proximity area 120 is negative, the first count value may not be increased. When the accumulated first count value is equal to or greater than the first reference value, displaying the image of the display on the display panel 110 may be stopped.

In an embodiment, as described above, whether the screen off mode is entered may be determined not based on one rise of the proximity data of touch panel 140 but several rises of the proximity data, such that the accuracy of the operation of the screen off mode may be enhanced.

Figure 6:
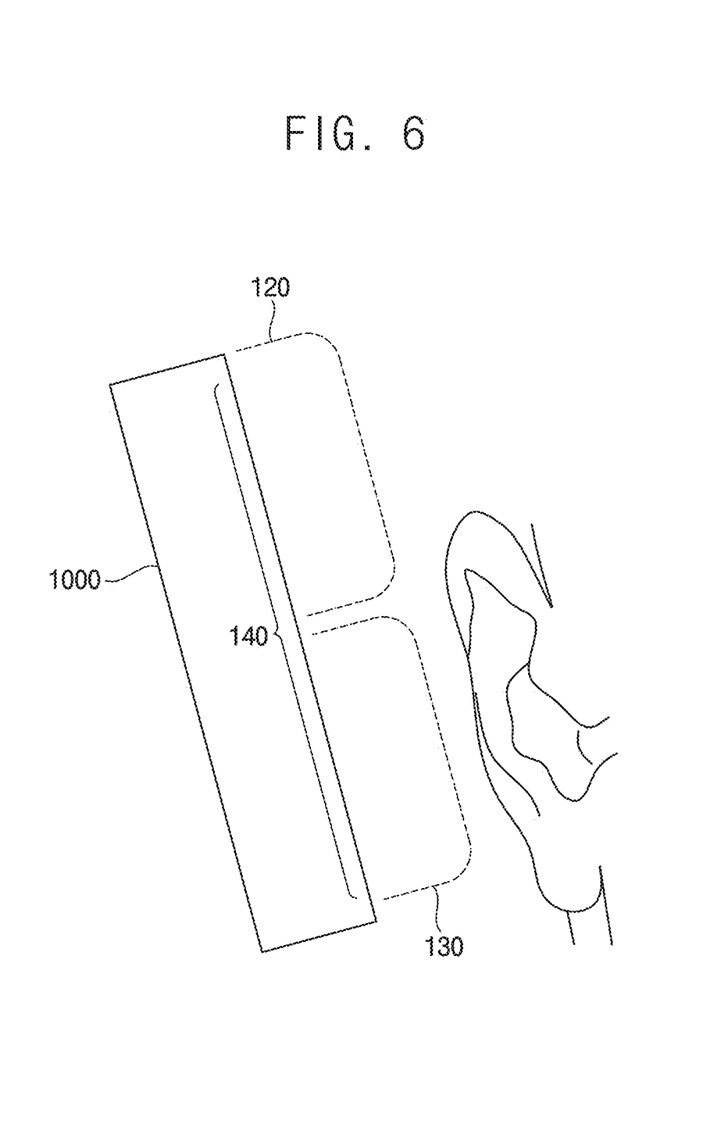
FIG. 6 is a diagram illustrating a case in which the conductor approaches the touch panel in the non-proximity area of FIG. 3.
Figure 7A:
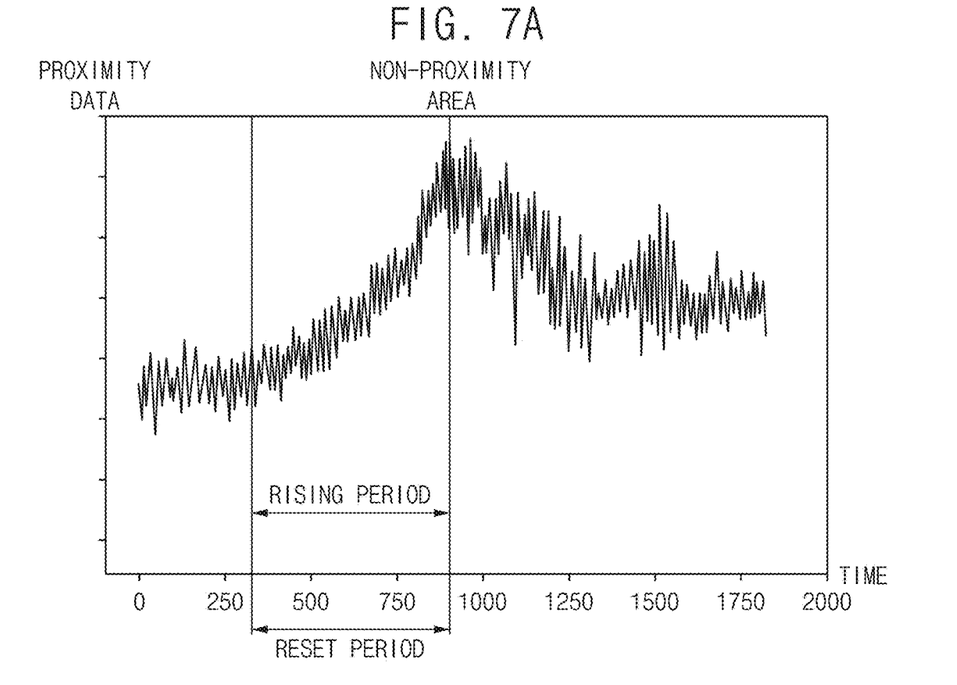
FIG. 7A is a graph illustrating examples of the proximity data in the non-proximity area, a rising period of the proximity data, and a reset period of the proximity data when the conductor approaches the touch panel in the non-proximity area of FIG. 3.
Figure 7B:
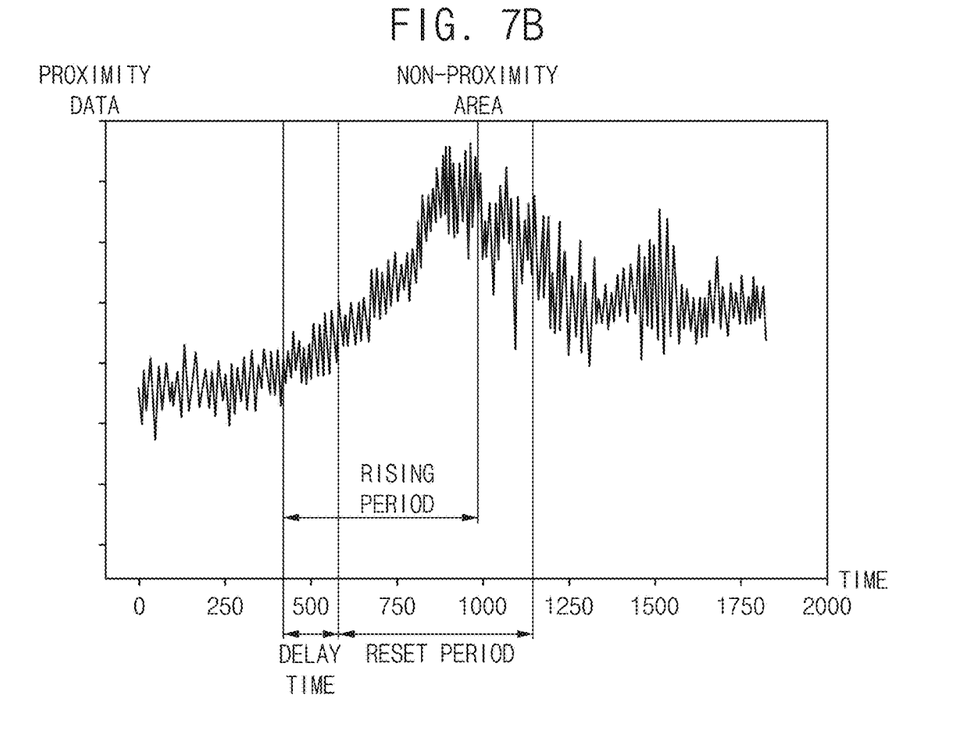
FIG. 7B is a graph illustrating examples of the proximity data in the non-proximity area, the rising period of the proximity data, and the reset period of the proximity data when the conductor approaches the touch panel in the non-proximity area of FIG. 3.
Figure 7C:
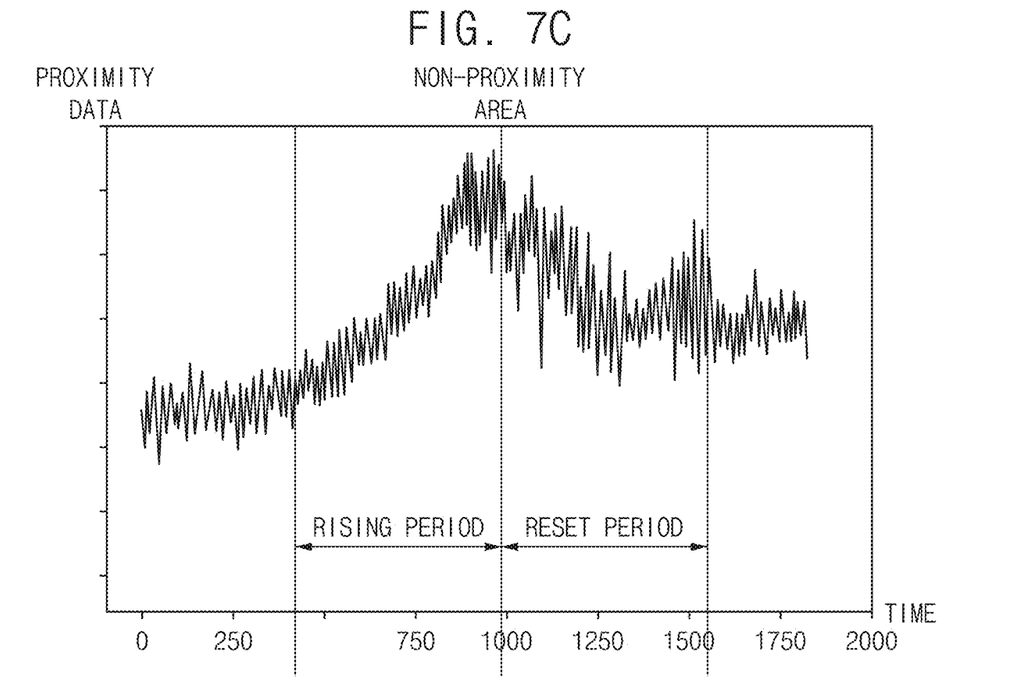
FIG. 7C is a graph illustrating an example of the proximity data in the non-proximity area, the rising period of proximity data, and the reset period of the proximity data when the conductor approaches the touch panel in the non-proximity area of FIG. 3.
Figure 8:
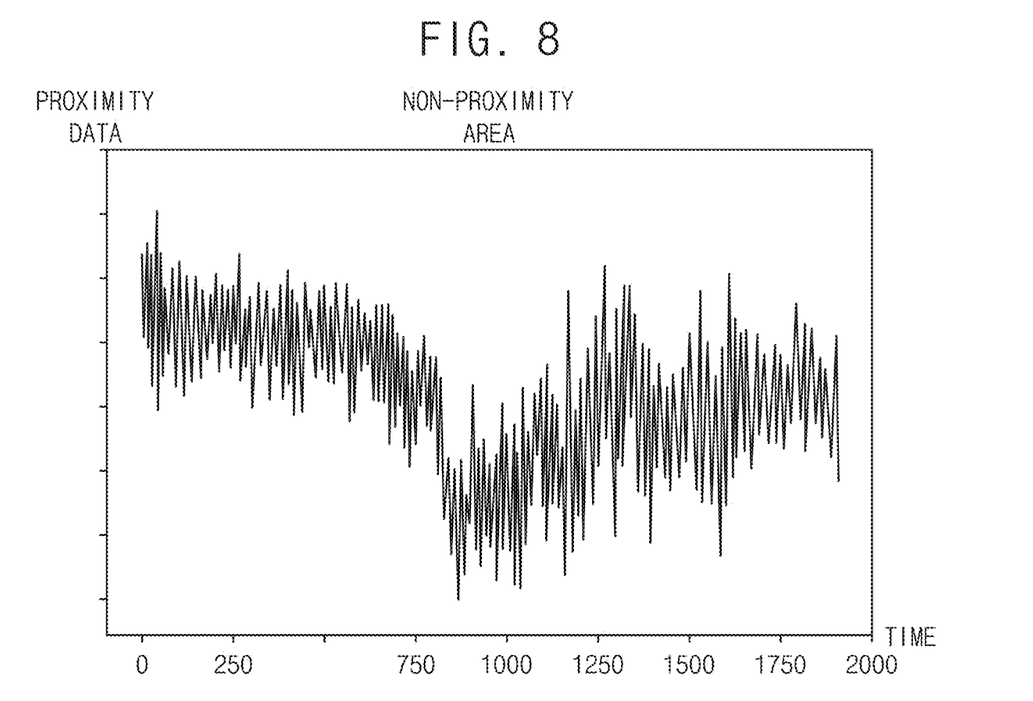
FIG. 8 is a graph illustrating the proximity data in the proximity area when the conductor approaches the touch panel in the non-proximity area of FIG. 3.

FIG. 6 is a diagram illustrating a case in which the conductor approaches the touch panel 140 in the non-proximity area 130 of FIG. 3. FIG. 7A is a graph illustrating examples of the proximity data in the non-proximity area 130, a rising period of the proximity data, and a reset period of the proximity data when the conductor approaches the touch panel 140 in the non-proximity area 130 of FIG. 3. FIG. 7B is a graph illustrating examples of the proximity data in the non-proximity area 130, the rising period of the proximity data, and the reset period of the proximity data when the conductor approaches the touch panel 140 in the non-proximity area 130 of FIG. 3. FIG. 7C is a graph illustrating an example of the proximity data in the non-proximity area 130, the rising period of proximity data, and the reset period of the proximity data when the conductor approaches the touch panel 140 in the non-proximity area 130 of FIG. 3. FIG. 8 is a graph illustrating the proximity data in the proximity area 120 when the conductor approaches the touch panel 140 in the non-proximity area 130 of FIG. 3.

Referring to FIGS. 6 to 8, when the conductor approaches the proximity area 120, the proximity data in the proximity area 120 may increase. When the distance between the proximity area 120 of the touch panel 140 and the conductor increases, the proximity data in the proximity area 120 may decrease. In addition, when the conductor approaches the non-proximity area 130, the proximity data in the non-proximity area 130 may increase. When the distance between the conductor and the non-proximity area 130 of the touch panel 140 increases, the proximity data in the non-proximity area 130 may decrease.

The proximity data in the proximity area 120 and the proximity data in the non-proximity area 130 may be influenced by each other. image of the display example, even when the conductor approaches the non-proximity area 130, the proximity data in the proximity area 120 may be affected, and the proximity data in the proximity area 120 may be changed. Thus, even when the conductor approaches the non-proximity area 130, the host processor 50 may determine that the conductor approaches the touch panel 140 in the proximity area 120 by a predetermined distance or less, and the proximity data may increase in the proximity area 120. When the conductor approaches and moves away from the non-proximity area 130, the proximity data in the proximity area 120 may be affected, and the proximity data in the proximity area 120 may increase. As such, the screen off mode may malfunction depending on the distance of the conductor in the non-proximity area 130.

In an embodiment of the invention, when the proximity data increases in the non-proximity area 130, the first count value may be reset to enhance the accuracy of the operation of the screen off mode. In an embodiment, for example, the host processor 50 may reset the first count value when the proximity data in the non-proximity area 130 increases to prevent the display device 100 from entering the screen off mode when the conductor approaches and moves away from the non-proximity area 130 and accordingly the proximity data in the proximity area 120 is affected and increases. Thus, when the conductor approaches the non-proximity area 130, the first count value in the proximity area 120 becomes 0, so that the display device 100 may be effectively prevented from erroneously entering the screen off mode.

In an embodiment, the host processor 50 may determine the rise (or increase) of the proximity data in the proximity area 120 based on the slope of the proximity data in the proximity area 120. In an embodiment, for example, the host processor 50 may determine the distance between the proximity area 120 and the conductor based on the proximity data provided from the proximity area 120. In an embodiment, the rise of the proximity data in the proximity area 120 may be determined based on the slope of the proximity data in the proximity area 120 to determine the distance between the proximity area 120 and the conductor.

In an embodiment, the host processor 50 may extract two proximity data in the proximity area 120 at the predetermined time interval, and when the slope of the two proximity data in the proximity area 120 is positive, the first count value may be increased. In an embodiment, for example, the host processor 50 may extract the proximity data in the proximity area 120 at the predetermined time interval, and may generate the first count value by counting the rise of the proximity data in the proximity area 120. When the slope of the two proximity data in the proximity area 120 is positive, the first count value may be increased, and when the slope of the two proximity data in the proximity area 120 is negative, the first count value may not be increased.

In an embodiment, the host processor 50 may determine the rise of the proximity data in the non-proximity area 130 based on the slope of the proximity data in the non-proximity area 130. In an embodiment, for example, the host processor 50 may determine the distance between the non-proximity area 130 and the conductor based on the proximity data in the non-proximity area 130. In such an embodiment, the host processor 50 may determine the rise of the proximity data in the non-proximity area 130 based on the slope of the proximity data in the non-proximity area 130 to determine the distance between the non-proximity area 130 and the conductor.

In an embodiment, the host processor 50 may extract two proximity data in the non-proximity area 130 at the predetermined time interval, and when the slope of the two proximity data in the non-proximity area 130 is positive, a second count value may be increased. In an embodiment, for example, the host processor 50 may extract the proximity data in the non-proximity area 130 at the predetermined time interval, and may generate the second count value by counting the rise of the proximity data in the non-proximity area 130. When the slope of the two proximity data in the non-proximity area 130 is positive, the second count value may be increased, and when the slope of two proximity data in the non-proximity area 130 is negative, the second count value may not be increased.

In an embodiment, when the proximity data in the non-proximity area 130 increase, the host processor 50 may reset the first count value generated by counting the rise of the proximity data in the proximity area 120. In an embodiment, for example, the host processor 50 may reset the first count value when the second count value in the non-proximity area 130 is equal to or greater than a second reference value.

In an embodiment, as illustrated in FIG. 7A, the first count value may be reset immediately after the proximity data in the non-proximity area 130 increases. A rising period of the proximity data in the non-proximity area 130 may be substantially the same as a reset period of the first count value of the proximity area 120. As illustrated in FIG. 8, the first count value is reset prior to the rise of the proximity data in the proximity area 120 so that the rise of the first count value of the proximity area 120 greater than the first reference value due to the influence of the non-proximity area 130 may be effectively prevented and the malfunction of entering the screen off mode, when the conductor approaches and moves away from the non-proximity area 130, may be effectively prevented.

In an embodiment, as illustrated in FIG. 7B, the first count value may be reset after a predetermined delay time from a time point when the proximity data in the non-proximity area 130 increases. In such an embodiment, the rising period of the proximity data in the non-proximity area 130 may not be the same as the reset period of the first count value of the proximity area 120. The reset period of the first count value of the proximity area 120 may be formed by being delayed by a delay time from the rising period of proximity data in the non-proximity area 130. As illustrated in FIG. 8, the first count value is reset while the proximity data in the proximity area 120 is increasing so that the rise of the first count value of the proximity area 120 greater than the first reference value due to the influence of the non-proximity area 130 may be effectively prevented and the malfunction of entering the screen off mode, when the conductor approaches and moves away from the non-proximity area 130, may be effectively prevented.

In an embodiment, as illustrated in FIG. 7C, the first count value may be reset by a rising period of the proximity data in the non-proximity area 130 from a time point when the rise of the proximity data in the non-proximity area 130 is finished. In such an embodiment, the rising period of the proximity data in the non-proximity area 130 may not same as the reset period of the first count value of the proximity area 120. The reset period of the first count value of the proximity area 120 may start at an end of the rising period of the proximity data in the non-proximity area 130 and last as long as the rising period of the proximity data in the non-proximity area 130. As illustrated in FIG. 8, the first count value is reset throughout the rising period of the proximity data in the proximity area 120 so that the rise of the first count value in the proximity area 120 greater than the first reference value due to the influence of the non-proximity area 130 may be effectively prevented and the malfunction of entering the screen off mode, when the conductor approaches and moves away from the non-proximity area 130, may be effectively prevented.

Figure 9:
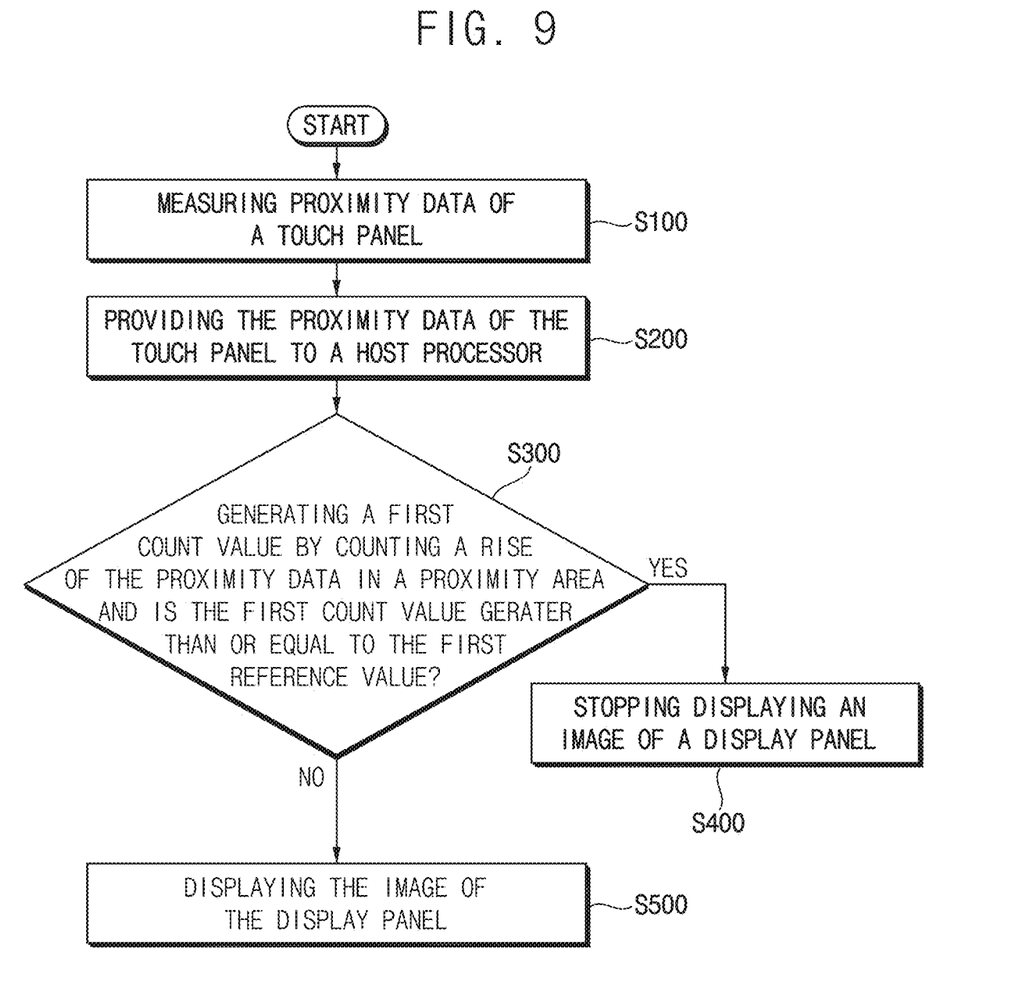
FIG. 9 is a flowchart illustrating a method of driving the display device when the conductor approaches the touch panel in the proximity area of FIG. 3.
Figure 10:
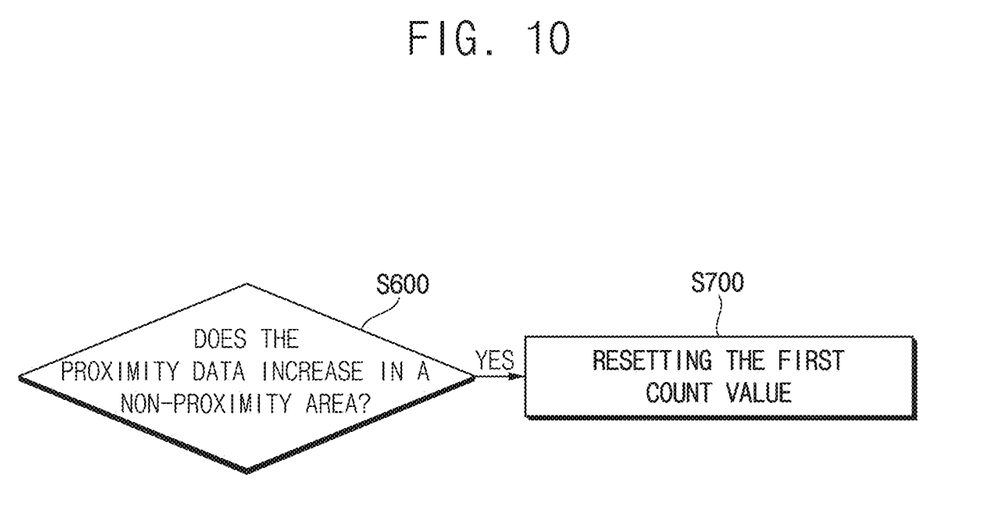
FIG. 10 is a flowchart illustrating a method of driving the display device when the conductor approaches the touch panel in the non-proximity area of FIG. 3.

FIG. 9 is a flowchart illustrating a method of driving the display device 100 when the conductor approaches the touch panel 140 in the proximity area 120 of FIG. 3. FIG. 10 is a flowchart illustrating a method of driving the display device 100 when the conductor approaches the touch panel 140 in the non-proximity area 130 of FIG. 3.

Referring to FIGS. 1 to 10, in an embodiment of a method of driving the display device 100 of the invention, when the conductor approaches the touch panel 140 in the proximity area 120, the proximity data of the touch panel 140 is measured (S100), and the proximity data of the touch panel 140 is provided to the host processor 50 (S200), and the host processor 50 counts a rise of the proximity data in the proximity area 120 to generate the first count value, and whether the first count value is equal to or greater than the first reference value is determined (S300). When the first count value is equal to or greater than the first reference value (YES), the host processor 50 stops displaying the image on the display panel 110 (S400), and when the first count value is less than the first reference value (NO), the host processor 50 causes the display panel 110 to display the image (S500).

In addition, when the conductor approaches the touch panel 140 in the non-proximity area 130 and the proximity data in the non-proximity area 130 increases (S600: YES), the host processor 50 may reset the first count value in the proximity area 120 (S700).

In an embodiment, in the display device 100, when the conductor approaches the touch panel 140 in the proximity area 120, the proximity data of the touch panel 140 may be measured (S100), and the proximity data of the touch panel 140 may be provided to the host processor 50 (S200). When the conductor approaches the touch panel 140, the host processor 50 may determine whether the conductor approaches the touch panel 140 by the change amount of the capacitance of the internal electrode of the display device 100. In an embodiment, for example, when the conductor approaches the touch panel 140, the proximity data of the touch panel 140 may increase. When the distance between the conductor and the touch panel 140 increases, the proximity data of the touch panel 140 may decrease.

In an embodiment, the host processor 50 may count the rise of the proximity data in the proximity area 120 to generate the first count value, and whether the first count value is equal to or greater than the first reference value may be determined (S300). When the first count value is equal to or greater than the first reference value, the host processor 50 may stop displaying the image on the display panel 110 (S400), and when the first count value is less than the first reference value, the host processor 50 may cause the display panel 110 to display the image (S500). When the determination process of whether to enter the screen off mode is performed once, the accuracy of the determination of whether the conductor approaches the touch panel 140 may be low. Thus, even when the conductor does not approach the touch panel 140, the display panel 110 may erroneously enter the screen off mode, in which the image is not displayed, due to a signal interference or a noise. Therefore, the accuracy of the operation of the screen off mode may be low.

Thus, in an embodiment of the invention, the host processor 50 may count the rise of the proximity data of the touch panel 140 in the proximity area 120 to determine whether to enter the screen off mode to enhance the operation of the accuracy of the screen off mode. Accordingly, since whether to enter the screen off mode may be determined not based on one rise of the proximity data of touch panel 140 but several rises of the proximity data, the accuracy of the operation of the screen off mode may be enhanced.

The host processor 50 may enhance the accuracy of the operation of the screen off mode by counting the rise of the proximity data of the touch panel 140 in the proximity area 120 to determine whether to enter the screen off mode. In an embodiment, for example, the host processor 50 may receive the proximity area 120 in the proximity area 120. The host processor 50 may determine whether the conductor approaches the touch panel 140 in the proximity area 120 based on the proximity data provided from the touch panel 140. In addition, the host processor 50 may generate a first count value by counting the rise of the proximity data in the proximity area 120. The host processor 50 may determine whether the first count value is equal to or greater than a first reference value, and when the first count value is equal to or greater than the first reference value, the display device 100 may enter the screen off mode. The host processor 50 may generate the first count value by counting the rise of the proximity data in the proximity area 120, and when the first count value is equal to or greater than the first reference value, the display panel 110 may be powered off.

In an embodiment, when the conductor approaches the touch panel 140 in the non-proximity area 130 and the proximity data in the non-proximity area 130 increases (S600), the host processor 50 may reset the first count value in the proximity area 120 (S700).

In an embodiment, as illustrated in FIG. 7A, the first count value may be reset immediately the proximity data in the non-proximity area 130 increases. Alternatively, as illustrated in FIG. 7B, the first count value may be reset after the predetermined delay time from a time point when the proximity data in the non-proximity area 130 increases. Alternatively, as illustrated in FIG. 7C, the first count value may be reset by the rising period of the proximity data in the non-proximity area 130 from a time point when the rise of the proximity data in the non-proximity area 130 is finished.

According to an embodiment, the first count indicating the rise of the proximity data in the proximity area 120 may be reset, when the proximity data rises in the non-proximity area 130. Accordingly, when the conductor approaches and moves away from the non-proximity area 130, the malfunction of entering the screen off mode may be effectively prevented. Thus, the accuracy of the screen off mode function may be enhanced and the reliability of the display device may be enhanced.

Figure 11:
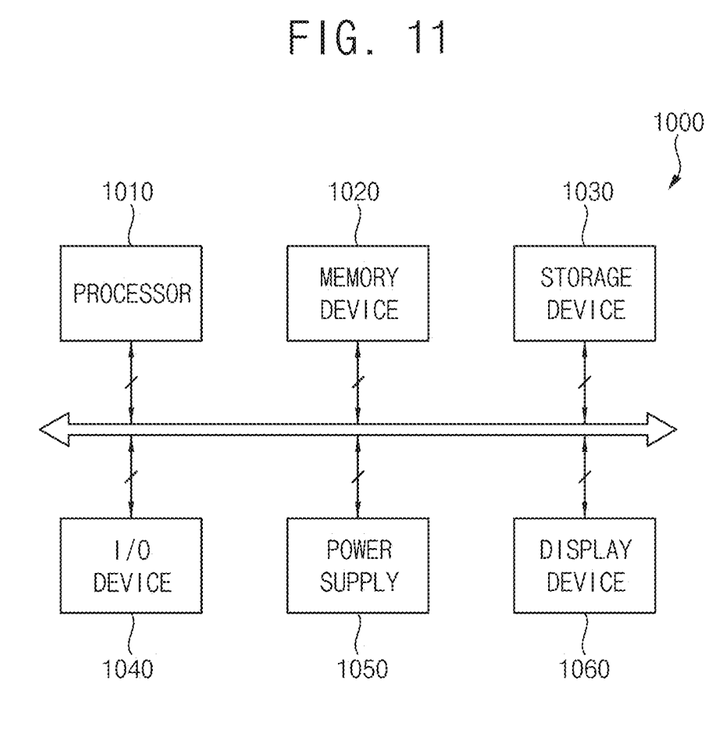
FIG. 11 is a block diagram illustrating an electronic device according to an embodiment of the invention.
Figure 12:
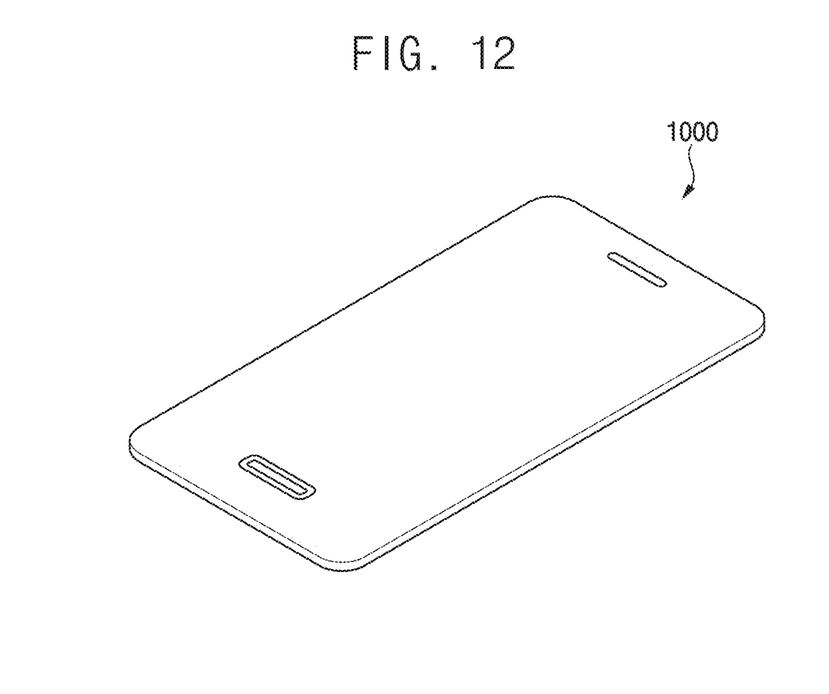
FIG. 12 is a diagram illustrating an embodiment in which the electronic device of FIG. 11 is implemented as a smart phone.

FIG. 11 is a block diagram illustrating an electronic device 1000 according to embodiment of the invention. FIG. 12 is a diagram illustrating an embodiment in which the electronic device 1000 of FIG. 11 is implemented as a smart phone.

Referring to FIGS. 11 and 12, an embodiment of the electronic device 1000 may include a processor 1010, a memory device 1020, a storage device 1030, an input/output (I/O) device 1040, a power supply 1050, and a display device 1060. The display device 1060 may be the display device 100 of FIG. 1. In addition, the electronic device 1000 may further include a plurality of ports for communicating with a video card, a sound card, a memory card, a universal serial bus (USB) device, other electronic device, and the like. In an embodiment, as illustrated in FIG. 12, the electronic device 1000 may be implemented as a smart phone. However, the electronic device 1000 is not limited thereto. For example, the electronic device 1000 may be implemented as a cellular phone, a video phone, a smart pad, a smart watch, a tablet personal computer (PC), a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060. The power supply 1050 may provide power for operations of the electronic device 1000.

The inventions may be applied to any display device and any electronic device including the touch panel. For example, the inventions may be applied to a mobile phone, a smart phone, a tablet computer, a digital television (TV), a three-dimensional (3D) TV, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
    a display panel;
    a touch panel on the display panel;
    a host processor which receives proximity data of the touch panel; and
    a display panel driver which receives an input control signal from the host processor and drives the display panel based on the input control signal;
    wherein the touch panel includes a proximity area and a non-proximity area,
    wherein the host processor counts a rise of the proximity data in the proximity area to generate a first count value, and
    wherein the host processor resets the first count value when the proximity data in the non-proximity area increases.

2. The display device of claim 1, wherein the host processor stops displaying an image on the display panel when the first count value is equal to or greater than a first reference value.

3. The display device of claim 1, wherein the host processor counts the rise of the proximity data in the non-proximity area to generate a second count value and resets the first count value when the second count value is greater than or equal to a second reference value.

4. The display device of claim 3, wherein the host processor determines the rise of the proximity data in the non-proximity area based on a slope of the proximity data.

5. The display device of claim 4, wherein the host processor extracts two proximity data at a predetermined time interval, and increases the second count value when the slope of the two proximity data is positive.

6. The display device of claim 1, wherein the host processor determine the rise of the proximity data in the proximity area based on the slope of the proximity data.

7. The display device of claim 6, wherein the host processor extracts two proximity data at a predetermined time interval, and increases the first count value when the slope of the two proximity data is positive.

8. The display device of claim 1, wherein the non-proximity area of the touch panel is disposed lower than the proximity area of the touch panel.

9. The display device of claim 1, wherein the first count value is reset immediately after the proximity data in the non-proximity area increases.

10. The display device of claim 1, wherein the first count value is reset after a predetermined delay time from a time point when the proximity data in the non-proximity area increases.

11. The display device of claim 1, wherein the first count value is reset by a rising period of the proximity data in the non-proximity area from a time point when the rise of the proximity data in the non-proximity area is finished.

12. The display device of claim 1, wherein the proximity data is a capacitance.

13. A method of driving a display device, the method comprising:
    measuring proximity data of a touch panel of the display device;
    providing the proximity data of the touch panel to a host processor of the display device;
    generating a first count value by counting a rise of the proximity data in a proximity area of the touch panel; and
    resetting the first count value when the proximity data in a non-proximity area of the touch panel increases.

14. The method of claim 13, further comprising:
    stopping displaying an image of a display panel of the display device when the first count value is equal to or greater than a first reference value.

15. The method of claim 13, wherein the host processor counts a rise of the proximity data in the non-proximity area to generate a second count value, and resets the first count value when the second count value is greater than or equal to a second reference value.

16. The method of claim 15, wherein the host processor determines the rise of the proximity data in the non-proximity area based on a slope of the proximity data.

17. The method of claim 16, wherein the host processor extracts two proximity data at a predetermined time interval, and increases the second count value when the slope of the two proximity data is positive.

18. The method of claim 13, wherein the first count value is reset immediately after the proximity data in the non-proximity area increases.

19. The method of claim 13, wherein the first count value is reset after a predetermined delay time from a time point when the proximity data in the non-proximity area increases.

20. The method of claim 13, wherein the first count value is reset by a rising period of the proximity data in the non-proximity area from a time point when the rise of the proximity data in the non-proximity area is finished.

* * * * *